United States Patent [19]

Bosley

[11] Patent Number: 5,343,891
[45] Date of Patent: Sep. 6, 1994

[54] FLUID COUPLINGS

[75] Inventor: Kevin J. Bosley, Aberdeen, Scotland

[73] Assignee: FSSL Limited, Ellon, Scotland

[21] Appl. No.: 987,270

[22] PCT Filed: Sep. 26, 1991

[86] PCT No.: PCT/GB91/01665
§ 371 Date: Apr. 30, 1993
§ 102(e) Date: Apr. 30, 1993

[87] PCT Pub. No.: WO92/07165
PCT Pub. Date: Apr. 30, 1992

[30] Foreign Application Priority Data
Oct. 13, 1990 [GB] United Kingdom ............. 9022284.5

[51] Int. Cl.⁵ ............................................. F16L 37/28
[52] U.S. Cl. ............................ 137/614.04; 277/215; 285/18
[58] Field of Search ............ 137/614.04, 614.05, 137/614.03, 614.02; 251/214; 277/215, 188 R, 188 A; 285/18

[56] References Cited

U.S. PATENT DOCUMENTS

| | | | |
|---|---|---|---|
| 3,236,251 | 2/1966 | Hanson | 277/188 R |
| 4,768,538 | 9/1988 | Mintz et al. | 137/614.04 |
| 5,085,250 | 2/1992 | Kendrick | 277/215 X |
| 5,127,661 | 7/1992 | Franson et al. | 277/215 X |

*Primary Examiner*—Gerald A. Michalsky
*Assistant Examiner*—Kevin L. Lee
*Attorney, Agent, or Firm*—Joseph S. Iandiorio; Kirk Teska

[57] ABSTRACT

A subsea fluid coupling includes self-sealing male and female couplers, and an elastic O-ring seal accommodated in the female coupler for sealing around the male coupler. The leading pheriphery of the male coupler is provided with ridges and channels which respectively support the seal and allow fluid flow pass the seal during withdrawal of the male coupler.

9 Claims, 3 Drawing Sheets

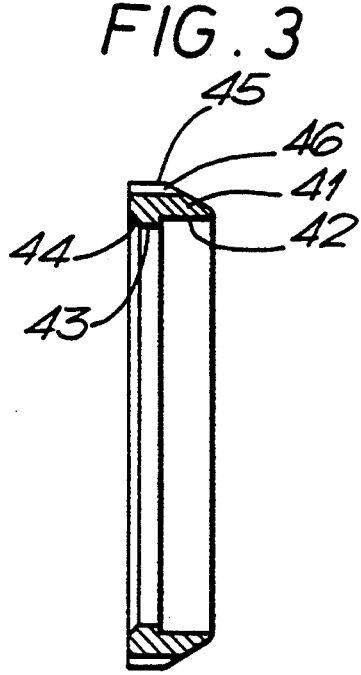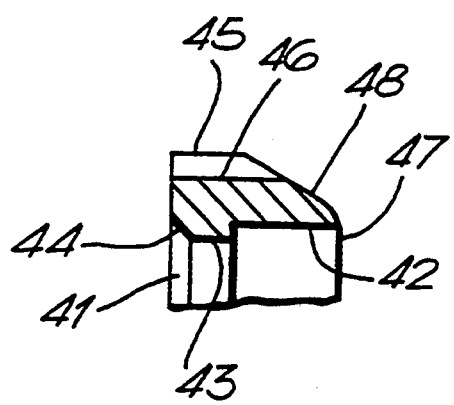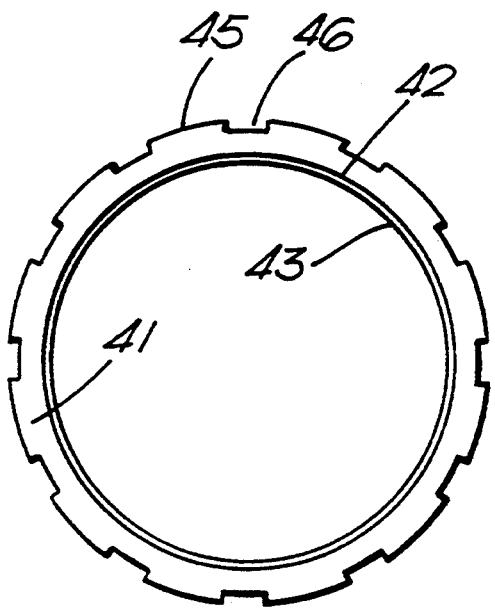

FLUID COUPLINGS

This invention relates to couplings for fluid lines and particularly though not exclusively to hydraulic couplings which are employed to couple very high pressure hydraulic lines in subsea control systems and similar circumstances.

BACKGROUND OF THE INVENTION

Couplings for high pressure lines, particularly those intended for use subsea, are customarily self-sealing, normally comprising a female coupler or receiver and a male coupler or probe insertable in the receiver. The couplers include mutually engageable means, normally spring loaded poppet valves, which engage when the couplings are mated so the high pressure fluid can flow from one coupler to the other coupler, and seal the ends of the couplers and the lines connected to them when the couplers are disengaged. It is necessary to provide at least one seal between the couplers and normally at least two seals between them in order to prevent egress of hydraulic working fluid from the coupling and, particularly for use subsea, to inhibit ingress of seawater into the interior of the coupling. Such seals are required to be durable and reliable because the couplings are usually required to remain operational for very long periods of time.

Various different forms of seal have been proposed for such couplings. Such forms include crush seals between axially confronting parts of the couplers and more recently pressure-responsive resilient metal seals, usually with a C-section. Examples of the latter form of seal are provided by British Patents Nos. 2183310 and 2201212, U.S. Pat. Nos. 4834139 and 4768538.

Some of the couplings described in the foregoing Patents and also various other forms of coupling have employed a elastomeric seal, usually an O-ring seals, usually as a second seal auxiliary to a metallic crush seal or radial pressure responsive metal seal. Elastomeric seals and particularly elastomeric O-rings are attractive for reasons of reliability and simplicity of design, but have the disadvantage in male/female self-sealing subsea couplings that such seals have a tendency to be displaced when the couplers are parted. On separation of the male and female couplers, there is normally a phase in which there is a tendency for the creation of a vacuum in the space between the couplers and the consequent rapid inrush of external fluid (such as seawater) into the space can dislodge the seal from its location, which is usually an annular recess inside the bore of the female coupler.

SUMMARY OF THE INVENTION

The present invention particularly concerns therefore a coupling of the foregoing type wherein simple and reliable means are provided for facilitating the containment of an O-ring seal against inrush of fluid when the male and female couplers are separated.

In a preferred form of the invention, a fluid coupling comprises a female coupler and a male coupler insertable therein, the couplers including mutually engageable self-sealing means for allowing fluid flow between the couplers on the mating thereof, the female coupler having means such as an internal recess which accommodates an elastomeric ring for sealing engagement with the periphery of the male coupler, the male coupler having surface portions which resist displacement of the O-ring from the recess on the withdrawal of the male coupler from the female coupler and at least one channel or passage which allows fluid to flow past the ring while the said portions are resisting the displacement of the ring.

The said portions, which may or may not be integral with the male coupler, may comprise ridges or mesas. There may be several channels spaced around the leading periphery of the male coupler.

The invention also provides in another aspect a subsea fluid coupling comprising a female coupler and a male coupler including mutually engageable means for allowing fluid flow between the couplers on the mating thereof, the male coupler having a leading portion for mating insertion in the female coupler and the female coupler including an annular recess accommodating an elastomeric ring for providing a seal around the periphery of the male coupler, the coupler having at the periphery of the said leading portion means providing at least one surface channel which allows fluid to flow past the said ring and ridges which resist displacement of the ring from the recess.

The invention further provides in another aspect a fluid coupling comprising a female coupler and a male coupler which has a leading portion insertable in the female coupler, the female coupler including at least one elastomeric sealing ring disposed in a recess and positioned for sealing engagement with the male coupler, wherein the male coupler carries a resilient member shaped to define the peripheral edge part of the leading portion and including at least one channel for the flow of fluid past said sealing ring during withdrawal of the male coupler from the female coupler.

DESCRIPTION OF THE DRAWINGS

The present invention will now be described by way of example with reference to the accompanying drawings, in which:

FIGS. 3 to 5 are a sectional view, a sectional detail and an end view respectively of a resilient channelled ring member for use with the male coupler as shown in FIG. 1.

DETAILED DESCRIPTION

For convenience the invention will be described in detail with reference to an embodiment generally similar to that described in the U.S. Pat. No. 4,768,538 (Mintz et al.). However it is not intended to limit the invention to such a particular configuration of coupling and the present invention may be embodied in different ways in self-sealing couplings which include rubber or similar elastomeric or polymeric seals for sealing between male and female couplers.

Figure 1:
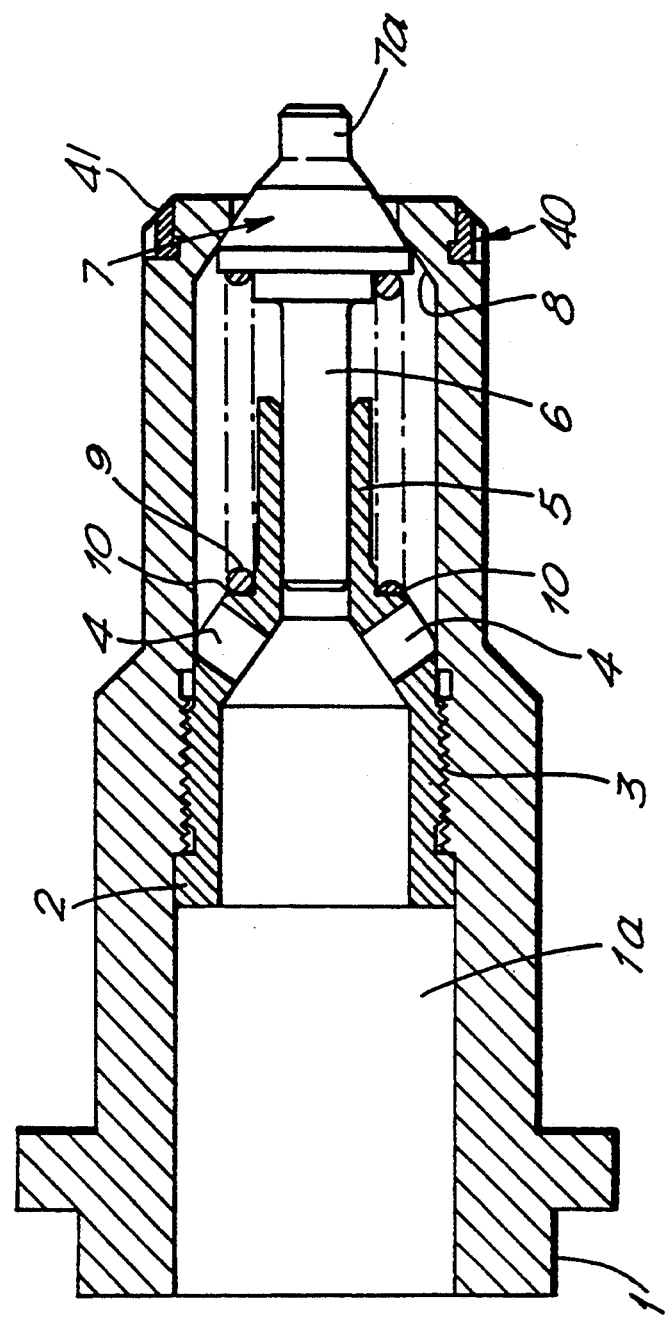
FIG. 1 is a sectional view of a male coupler.
Figure 2:
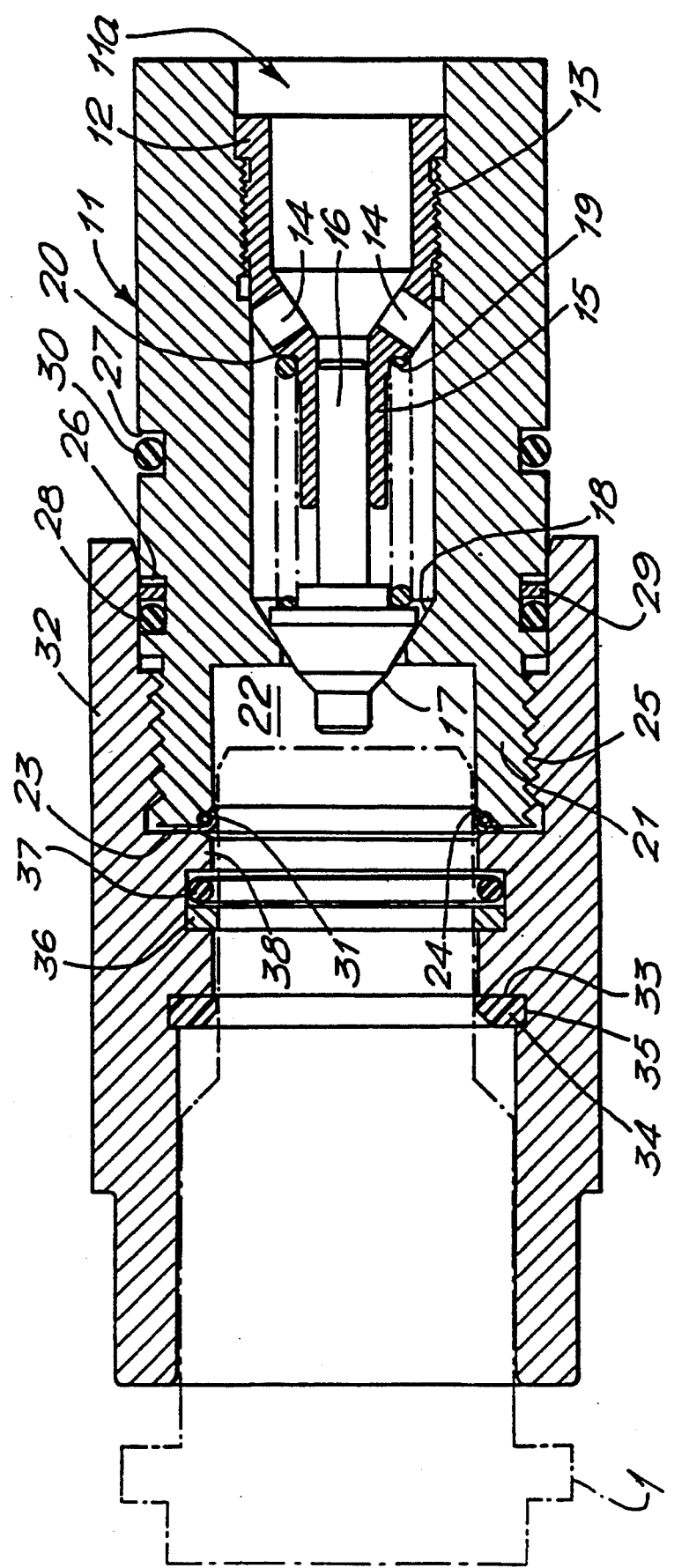
FIG. 2 is a sectional view of a female coupler, the outline of a male coupler being shown in ghost.

The male coupler shown in FIG. 1 and the female coupler shown in FIG. 2 may be axially aligned in a conventional manner for mated engagement to form a coupling. In a typical application, a plurality of couplings each comprising male and female couplers, and each interconnected with respective fluid lines, are provided in female and male umbilical junction plates of a monitoring and/or control system of a hydrocarbon recovery system. In another application, the male couplers can each be mounted in a subsea control module mounting base, while the female couplers are each similarly mounted in the interface flange of a control module. When mated, the couplers interconnect respective fluid lines without loss of the fluid or of the fluid pressure which is being transmitted through the lines, while each coupling also seals the exterior subsea environment from the transmitted fluids. Mating and unmating of the couplings results in little, if any, loss of transmitted fluid to the environment, and the subsea mounting bases may be coupled and uncoupled numerous times during the life of the subsea operation.

Referring first to FIG. 1, the male coupler has a cylindrical body 1 with an internal bore 1a in which there is a cylindrical insert 2 having a screw fitting 3 to the inside of the bore. The insert 2 has apertures 4 for allowing fluid flow and a forward extension 5 which receives the stem 6 of a poppet valve 7. This valve is urged against a conical seat 8 at the forward end of the male coupler by means of a compression spring 9 between the head of the valve and a shoulder 10 on the insert 2. Fluid flow into or out of the forward end of the male coupler is permitted when the tip 7a of the poppet valve 7 is depressed by its engagement with the tip of a similar valve in the female receiver.

At its forward end the male coupler has a bevelled periphery 40 and is adapted to carry a pressure-relief ring 41 which will be described in more detail later.

The female receiver as shown in FIG. 2 has a body 11 which has an internal bore 11a in which there is an insert 12 similar to the insert 2 for the male coupler. This insert has a screw fitting 13 to the inside of the bore 11a, apertures 14 and a forward extension 15 similar to apertures 4 and extension 5, and the extension receives a stem 16 of a poppet valve 17 urged against a conical seat 18 by means of spring 19 between the head of the valve and the shoulder 20 on the insert 12, all as described relative to the male coupler. When the coupling is fully mated, the internal bore 1a of the male coupler is axially aligned with the internal bore 11a of the female coupler.

The female coupler has at its forward end a cylindrical part 21 which defines a receiving socket or chamber 22 for the male coupler. At the end of the female, in the end face 23 of the part 21, is an annular recess 24 which supports an annular seal 31. This seal preferably provides a metal-to-metal seal between the couplers and preferably provides a static seal against the female coupler and a dynamic seal against the male coupler. For this purpose the seal 31 may comprise a J-section sealing member of which an annular lip provides a radial seal around and against the periphery of the male coupler and an outer flat rim which is disposed against the end face 23 to provide a static axial seal. A resilient tube may be disposed between the lip and the recess 24 to urge the lip into engagement with the periphery of the male coupler. Alternatively the seal could be a metal pressure-responsive seal as described in U.S. Pat. No. 4,768,538.

On the outside of the cylindrical part 21 is a screw threading 25, which co-operates with a retainer consistuted by a sleeve 32.

The outer surface of the body 11 of the female coupler includes two circumferential grooves 26 and 7. In the groove 26 are an elastomeric O-ring 28 and a packing ring 29. In the groove 27 is an elastomeric O-ring 30, intended for improving the seal between the female coupler and its fluid line (not shown).

The sleeve 32 has a screw threading engaging the threading 25, the sleeve being fitted such that it is coaxial with the female receiver. The elastomeric O-ring 28 engages the inner periphery of the sleeve near one end thereof to provide a seal between the female coupler and the sleeve and to prevent leakage from the interior of the coupling through the screw threads 25 into the outside environment.

On the inside of the sleeve 32 is an internal flange 33 which supports an annular bushing 34 which is of a resilient polymeric material such as PTFE and has a slightly smaller inside diameter than the flange 34. The bushing seats in an annular groove 35 adjacent the flange 34. The purpose of the alignment bushing is to guide the male coupler during insertion and withdrawal.

Forward of the flange 34 is a packing ring 36. Adjacent this ring is an elastomeric seal 37 in the form of an O-ring. This seal engages the periphery of the male coupler and, as described in U.S. Pat. No. 4,768,538, provides a secondary, or back-up seal in the event that the primary seal 31 should fail.

In this embodiment of the invention, the sleeve 32 has an internal annular flange part 38 which extends inwardly over the axial end face 23 of the cylindrical part 21.

The flange 38 partly extends over the outer part of the seal 31 to help retain this seal in place. The sleeve is screwed on to the female couler so as to press the outer rim of the seal 31 firmly against the end face 23 of the body 11.

The O-ring 37 provides a seal against egress of fluid from the interior of the coupler to outside but also serves to seal the interior of the coupler against ingress of seawater.

When the male coupler is extracted from the female coupler, a vacuum is created in the socket or chamber 22 formed in front of the male coupler and between the couplers. The external pressure causes an inrush of fluid through the space between the periphery of the male coupler and the female coupler. The inrush tends to extrude the O-ring from its location into the chamber. Commonly the leading portion of the male coupler is rounded or bevelled and although this shaping of the male coupler is desirable in order to facilitate entry of the male coupler, it does not hinder the extrusion of the O-ring under the force of the external pressure.

The present invention alleviates this disadvantage by providing at the leading periphery 40 of the male probe means 41 which allow fluid flow into the socket or chamber past the O-ring yet inhibit the movement of the O-ring into the chamber 22.

This means may be embodied by parts which may or may not be integral with the male probe and which provide ridges which are of lesser diameter than the periphery which is to engage the metal seal but which have a height and length sufficient to inhibit the extrusion of the O-ring through a gap between the male probe and the adjacent female coupler. The ridges are interrupted by at least one and preferably more than one surface channel or slot. Such channels or slots may be regularly spaced about the periphery of the male coupler and allow the flow of external fluid into the chamber to relieve the vacuum therein, while the ridges engage the O-ring.

As is particularly shown in FIGS. 3 to 5, the means 41 is constituted by a resilient ring member which has an inner surface shaped to provide a relaxation fit on the male coupler, which is shaped in a complementary manner. The inner surface comprises a cylindrical portion 42 including an inwardly protruding annular ridge 43, which fits into a corresponding peripheral groove in the male coupler, and a bevelled margin 44 which assists the fitting of the member 41 onto the end of the male coupler. The outer surface of the member 41 is formed with ridges 45 and channels 46 alternating around the periphery of the ring. The member 41 has a front flank 48 which is bevelled at a suitable angle such as 30°, there being a smooth transition between the flank 48 and the front 47 of the member 41.

The height of the ridges increases from zero to a maximum at about the central plane of the member 41 and is thereafter constant. The ridges are at their rear margin preferably flush with the adjacent peripheral part of the male coupler.

Accordingly, as the male coupler is withdrawn from the female coupler, the O-ring 37 can be supported by the ridges 45 for long enough to allow the fluid to enter the chamber 22 by way of the channels 46. In this manner the likelihood of dislocation of the O-ring is much reduced.

The use of a separate member 41 at the leading periphery of the male coupler is preferable to forming the ridges and grooves in the body of the coupler because the ring can be changed in the event of damage caused to the leading periphery by misalignment of the male and female couplers during the insertion phase.

I claim:

1. A fluid coupling comprising a female coupler and a male coupler insertable therein, the couplers including mutually engageable self-sealing means for allowing fluid flow between the couplers on the mating thereof, the female coupler having means which accommodates an elastomeric ring for sealing engagement with the periphery of the male coupler, the male coupler having peripheral surface portions which resist displacement of the ring while said surface portions engage said ring during withdrawal of the male coupler from the female coupler and at least one channel or passage which allows fluid to flow past the ring while the said portions are resisting displacement of the ring.

2. A fluid coupling according to claim 1 wherein said portions comprise a plurality of ridges spaced around a leading periphery of the male coupler, and channels for said fluid flow are interspersed between said ridges.

3. A fluid coupling according to claim 2 wherein said portions and channels are constituted by a member which is secured to the male coupler.

4. A fluid coupling according to claim 3 wherein the member is a relaxation fit on the male coupler.

5. A fluid coupling according to claim 4 wherein the member has an internal ridge which engages a peripheral groove on the male coupler.

6. A subsea fluid coupling comprising a female coupler and a male coupler including mutually engageable means for allowing fluid flow between the couplers on the mating thereof, the male coupler having a leading portion for mating insertion in the female coupler and the female coupler including an annular recess accommodating an elastomeric ring for providing a seal around the periphery of the male coupler, the male coupler having at the periphery of said leading portion means providing at least one surface channel which allows fluid to flow past the said ring and ridges for engaging said ring, said ridges resisting displacement of the ring from the recess while said ridges engage said ring.

7. A fluid coupling comprising a female coupler and the male coupler which has a leading portion insertable in the female coupler, the female coupler including at least one elastomeric sealing ring disposed in a recess and positioned for sealing engagement with the male coupler, wherein the male coupler carries a resilient member for engaging said ring, said resilient member defining the peripheral edge part of the leading portion and including at least one channel for the flow of fluid past said sealing ring while said resilient member engages said ring during withdrawal of the male coupler from the female coupler.

8. A fluid coupling according to claim 7 wherein the resilient member has circumferentially spaced ridges and channels.

9. A fluid coupling according to claim 8 wherein the member is a relaxation fit on said male coupler.

* * * * *